United States Patent [19]

Francen

[11] 3,772,195

[45] *Nov. 13, 1973

[54] FIRE EXTINGUISHING COMPOSITION COMPRISING A FLUOROALIPHATIC SURFACTANT FLUORINE-FREE SURFACTANT

[75] Inventor: Vernon L. Francen, Roseville, Minn.

[73] Assignee: Minnesota Mining and Manufacturing Company, St. Paul, Minn.

[ * ] Notice: The portion of the term of this patent subsequent to Feb. 19, 1988, has been disclaimed.

[22] Filed: Feb. 5, 1971

[21] Appl. No.: 113,022

Related U.S. Application Data

[63] Continuation-in-part of Ser. No. 840,102, June 12, 1969, Pat. No. 3,562,156.

[52] U.S. Cl............... 252/8.05, 252/2, 169/1, 252/3, 252/307, 252/354, 252/355, 252/356, 254/357
[51] Int. Cl............... A62c 1/12, A62d 1/00
[58] Field of Search............ 252/2.3, 6.5, 8.05, 252/351, 353, 354, 355, 356, 357

[56] References Cited
UNITED STATES PATENTS

| | | | |
|---|---|---|---|
| 3,562,156 | 2/1971 | Francen | 252/8.05 |
| 3,258,423 | 6/1966 | Tuve et al. | 252/8.05 X |
| 3,475,333 | 11/1967 | Meldrum et al. | 252/3 |
| 3,047,619 | 7/1962 | Brace | 260/500 |
| 3,476,819 | 11/1969 | Trischler | 260/653 |

*Primary Examiner*—George F. Lesmes
*Assistant Examiner*—M. B. Wittenberg
*Attorney*—Alexander, Sell, Steldt & Delahunt

[57] ABSTRACT

Compositions are disclosed which form tough, durable, rapidly-forming and spreading films on the surface of hydrocarbon liquids comprising in combination a water-soluble fluoroaliphatic surfactant and a water-soluble synthetic imputrescible hydrocarbon-congruous organic fluorine-free surfactant and water. The films formed by these compositions are especially effective in suppressing the vaporization of hydrocarbon liquids into the air and are, therefore, useful for extinguishing liquid hydrocarbon fires.

6 Claims, 2 Drawing Figures

FIRE EXTINGUISHING COMPOSITION COMPRISING A FLUOROALIPHATIC SURFACTANT FLUORINE-FREE SURFACTANT

This application is a continuation-in-part of my application Ser. No. 840,102, filed June 12, 1969, now U.S. Pat. No. 3,562,156. vaporization The present invention relates generally to compositions for the preparation of tough, durable, rapidly-forming and spreading films on hydrocarbon liquids comprising in combination a water-soluble fluoroaliphatic surfactant, a water-soluble synthetic imputrescible hydrocarbon-congruous organic fluorine-free surfactant and water with or without a stabilizer. These films can be formed and spread over the surface of a volatile water insoluble liquid to provide an effective barrier to vaporization of the volatile liquid into an adjacent volume of air.

At the present time, substantially more than 1-½ billion metric tons of petroleum products are produced annually. These materials find their way throughout the world in tanks, ships, trucks, railroad cars and pipelines to storage tanks, processing plants, and untimately, to the consumer in drums, tanks, cans and bottles. Most of these petroleum products have a significant vapor pressure under the conditions of use and storage, and are thus continually evaporating into the air at each point of transfer, shipment and use. There are a number of obvious disadvantages to this free evaporation of volatile hydrocarbon materials. The simple economic loss may be significant; for example, in the handling of gasoline, the loss through evaporation between the refinery and the automobile can be as great as 5 percent of the product. Of greater significance, perhaps, is the situation in an area such as Southern California where the presence of large quantities of hydrocarbon materials in the air has been cited as a major factor in the smog problem. The evaporation losses occasioned in the processing and handling of petroleum products approaches the hydrocarbon output (combustion by-products) produced by automobiles. The most spectacular and pressing problem of free evaporation of hydrocarbon materials is the fire hazard involved. These materials are generally highly flammable and their vapors can form combustible mixtures with air. Adventitious sparks or other sources of ignition can result in a disastrous fire especially in the case of pipelines or large scale storage facilities. The threat of a major fire in a refinery tank farm, a service station, or on the decks or below deck areas of an aircraft carrier is an ever present hazard. Spills, whether resulting from an accidentally open valve, an overturned or broken container or an overturned tank truck, represent an immediate potential hazard. A positive, readily available, simply applied method for stopping the evaporation of flammable liquids under these conditions would represent a marked and significant improvement over present procedures.

It is accordingly an object of the present invention to provide compositions which can be used to form tough, durable, rapidly-forming and spreading vapor barrier films on hydrocarbon liquids.

Another object of the invention is to provide concentrate compositions which form water-containing surface films which inhibit the release of flammable vapors from a hydrocarbon liquid surface.

Other objects and advantages of the invention will become more fully apparent from the following detailed description.

The ability of surface films to minimize evaporation has long been known. Typically, a film, for example of cetyl alcohol, can be spread upon a reservoir in desert areas and cut the evaporation of water to one-half the evaporation level of water in the absence of the film. In a 1962 publication (Guenthner and Vietor, Industrial and Engineering Chemistry, September, 1962, page 168) it was recognized that fluorochemical compounds could be utilized to form barrier films for evaporation suppression on gasoline. The authors state that "the addition of 0.003 percent fluorochemical can reduce the evaporation of the gasoline under static conditions to the point of nonflammability." The restriction to static conditons points out a very significant limitation to the effective use of such films. In order to be an effective evaporation suppressant, it is necessary that the barrier film be rapidly formed initially and again after disturbance, and that the film be sufficiently mobile and capable of remianing remaining under conditons of motion so that it will establish and maintain a substantially continuous barrier. The fluorochemical film-forming systems known up until now have, however, formed films relatively slowly and have been incapable of maintaining or rapidly reestablishing a satisfactory barrier film after disruption by agitation.

A recent development related to the extinguishing of burning fuel, Tuve and Jablonski U.S. Pat. No. 3,258,423, is directed to films comprising water and specific fluorochemicals to produce a film on the fuel surface which cuts down the rate of evaporation so that reignition becomes difficult or impossible. This invention has resulted in the development of a fire extinguishing system vastly more efficient than any preceding methods. However, only a relatively few fluorochemicals in relatively high concentrations can be used to form such aqueous films resulting in an undesirably high cost for the fire-fighting composition.

The compositions of the present invention form tough, mobile, rapidly spreading, readily healing vapor barrier films. They can be formulated with lower quantities of the more expensive fluorochemical component than was necessary to achieve equivalent results with prior systems. They can be stored as dilute aqueous solutions in readiness for use particularly for preventive applications, e.g., prevention of fires from spilled fuels. More commonly, they will be distributed and stored as a concentrate which can be diluted at the time of use. A particularly desirable commercial item is a material which, at the time of use, would be diluted in the ratio of six volumes of concentrate to 94 volumes of water, i.e., diluted with about sixteen parts by volume of water. Standard commercially available mixing and dispensing equipment, e.g., fire-fighting equipment, is commonly available for this particualr concentrate.

Many of the compositions, in addition to forming a vapor barrier film, will, when mixed with large quantities of vaporized propellant or air, form relatively stable foams, particularly for the extinguishing of large fires. In some cases, it may be desirable to add an auxiliary foaming agent, such as a partially hydrolyzed protein, and/or auxiliary agents such as foam stabilizers exemplified by high molecular weight polyoxyethylene glycol (e.g., Polyox) and an alkyl ether of an alkylene glycol (e.g., butoxy hydroxy-ethoxy ethane) or freeze resistant components (glycerol or ethylene glycol). Generally speaking, these compositions are compatible with solid fire extinguishing agents such as powdered potassium bicarbonate.

The following tests and test procedures have been devised as convenient laboratory guides for determination of the performance characteristics of the various compositions. It has been found that compositions which "passed" these laboratory tests generally performed adequately in large scale field tests. Perhaps of more significance is the fact that compositions which "failed" the laboratory tests did not perform acceptably in field tests.

It should be recognized that the test hydrocarbon "fuel" used herein, cyclohexane, is a relatively difficult substrate on which to form films. In general, aromatic hydrocarbons such as toluene or xylene or higher-boiling aliphatic hydrocarbons such as gasoline, kerosene and fuel oil permit the formation of films at lower concentrations of surfactant. Accordingly, films formed on cyclohexane can be expected to be more effective films on the latter classes of hydrocarbons at any given surfactant concentration.

FILM FORMATION AND SPREADING TEST

1. Five drops of the test solution are placed in the center of a clean surface of cyclohexane contained in a 145 mm. petri dish at about 25° C.

2. By using reflected light, the time in seconds required for the applied solution to spread across the cyclohexane surface to the dish is measured (film speed).

SEAL TEST

1. Following Step 2 above, 15 additional drops of test solution are placed on the cyclohexane surface — distributed equally over the surface.

2. 60 seconds after the first of the additional 15 drops of test solution is added, a flame probe is passed (but not touching) over the cyclohexane surface. This result is an indication of vapor sealing. About 5 seconds should elapse before vapor burning is observed.

BURNBACK RESISTANCE TEST

1. The flame probe is then touched to the cyclohexane surface near an edge until a spot of ignition is achieved.

2. The time in seconds required to burn half way across the cyclohexane surface is measured (50 percent burnback). At least 2 seconds for 50 percent burnback is required for a composition to be considered a satisfactory extinguishing agent.

RESISTANCE TO AGITATION

1. This test consists of using the result of Step 1 of the seal test. A glass rod is used to agitate the fuel surface while a flame is held over the area of agitation (but not touching the fuel surface).

2. The time to ignition of the fuel is noted.

The compositions of this invention comprise in combination a fluoroaliphatic surfactant, a water-soluble synthetic imputrescible hydrocarbon-congruous organic fluorine-free surfactant and water. The fluoroaliphatic surfactant is a composition including in the same molecule both a fluoroaliphatic radical and a water solubilizing group, generally represented as $(R_f)_nQ_mZ$. The particular structure of the fluoroaliphatic surfactant is not critical; rather it is the balance of the physical properties of the compound that determines its usefulness for the purpose. It is necessary that the combination of fluoroaliphatic radical and water solubilizing group be so balanced as to provide a solubility in water at 25° C. of at least 0.01 percent by weight. It is preferred, particularly in the case where a concentrate is prepared, that the solubility in water be at least about 0.15 percent by weight. In order to function effectively as a film-spreading agent, the surfactant must be sufficiently surface active to provide a surface tension of less than about 28 dynes/cm., preferably less than 23 dynes/cm., in aqueous solution at a concentration of about 0.25 percent or less.

If the fluoroaliphatic surfactant is too soluble in hydrocarbon liquid, it will be extracted too rapidly from the aqueous film to provide sufficiently durable coverage. In general, this requires the presence of at least about 20 percent by weight of fluorine, i.e., carbon bonded fluorine, in the surfactant.

To possess these properties, the fluorinated aliphatic radical, $(R_f)_n$, where n is 1 or 2, can be generally described as a fluorinated saturated monovalent non-aromatic radical of at least 3 carbon atoms. The aliphatic chain may be straight, branched, or, if sufficiently large, cyclic and may include oxygen or trivalent nitrogen atoms bonded only to carbon atoms. A fully fluorinated radical is preferred, but hydrogen or chlorine atoms may be present as substituents provided that not more than one atom of either is present for every two carbon atoms, and preferably, the radical contains at least a terminal perfluoromethyl group. While radicals containing a larger number of carbon atoms will function adequately, compounds containing not more than about 20 carbon atoms are preferred since larger radicals usually represent a less efficient utilization of fluorine than is possible with shorter chains. Fluoroaliphatic radicals containing about 5 to 12 carbon atoms are most preferred.

The water solubilizing polar group Z represents an anionic, a cationic, a non-ionic or ampholytic moiety or combination thereof. Typical anionic groups would include $CO_2H$, $CO_2M$, $SO_2H$, $SO_2M$, $SO_3H$, $SO_3M$, $OP(OH)_2$, and $OP(OM)_2$, where M is a metallic ion, such as sodium, potassium, calcium, etc. Typical cationic groups would include $NH_2$, $NHR$, where R is a lower alkyl group such as methyl, ethyl or butyl, $NR_3'A$, where R' is a lower alkyl group or hydrogen and A is an anion, such as chloride, sulphate, phosphate, hydroxyl, etc. Typical non-ionic groups would include $-NR_2 \rightarrow 0$ and those derived from polyethylene oxide and mixed polyethylene oxide-polypropylene oxide polyols. Typical mixed or ampholytic groups would include $N(C_2H_4OH)_2$, $NHC_2H_4NHC_2H_4NH_2$, $N(CH_3)_2C_2H_4CO_2$, $N(CH_3)(C_2H_4CO_2H)_2 \rightarrow 0$, and the like.

The linking group $Q_m$, where m is an integer from 0 to 2, represents a multivalent, generally divalent, linking group such as alkylene, arylene, sulfonamido alkylene, carbonamido alkylene and the like. It will be noted that in some instances more than one $R_f$ group may attach to a single Q group and in other instances, a single $R_f$ group may be linked to more than one Q group, or may be linked by a single Q group to more than one polar solubilizing group.

With certain fluorochemical surfactants, simple aqueous solutions thereof have been found to spread and form films on a hydrocarbon fuel surface. In general, however, such an aqueous fluorochemical surfactant solution, although the surface tension is below 28 or even below 20 dynes per centimeter, spreads slowly and does not provide a satisfactory film. By utilizing the teachings of the present invention any such film-forming fluorochemical-water solutions can be caused to provide a stable film, the inherent film-forming tendency of the fluorochemical surfactant being enhanced by the addition of a compatible water-soluble fluorine-free surfactant. Compatability here means that the two types of surfactants, fluorine-containing and fluorine-free, do not interact to produce an inactive product. This is, a non-ionic fluoroaliphatic surfactant can be mixed with a non-ionic, an ionic, or a cationic fluorine-free surfactant; similarly, a non-ionic fluorine-free surfactant is compatible with all three classes of the fluoroaliphatic surfactants. However, a cationic surfactant is not compatible with an anionic surfactant and such combinations must, in general, be avoided if satisfactory film-forming characteristics are to be realized.

The following Tables graphically illustrate the reinforcing role of the fluorine-free surfactant in the film-forming characteristics of aqueous fluoroaliphatic surfactant solutions on a hydrocarbon fuel surface, in this case cyclohexane.

fluorochemical surfactant also are shown to produce films comparing favorably with the film formed by the aqueous fluorochemical surfactant solution at much higher concentrations.

Table 2 presents further data confirming the results reported in Table 1 and illustrates the general nature of the present discovery, viz., that any film-forming fluorochemical surfactant water solution can be caused to provide a more durable and stable film in the presence of a compatible fluorine-free surfactant.

The following table, Table 3, illustrates in dramatic fashion the active role assumed by the fluorine-free surfactant in the film-forming function of aqueous fluoroaliphatic surfactant solutions. The particular fluoroaliphatic surfactant having the structural formula shown did not form a surface film at any concentration, but with the addition of certain fluorine-free surfactants, films were formed as shown in the Table. The formulation used for this Table was as follows:

| | Weight % |
|---|---|
| $C_8F_{17}SO_2N(C_2H_5)C_2H_4OP(OH)_2$ | 0.36 |
| Fluorine-free surfactant | 0.25 |
| Polyoxyethylene glycol (Polyox N-10) | 0.54 |
| Water | Remainder |

TABLE 1

| Fluorochemical surfactant (FC) | FC conc., weight percent | Fluorine-free surfactant (FF) | FF conc., weight percent | Film | Film properties Speed (sec.) | Film properties Seal (sec.) | 50% burn-back (sec.) |
|---|---|---|---|---|---|---|---|
| $C_7F_{15}CONHC_3H_6N(CH_3)_2 \rightarrow O$ | 0.36 | | | Yes | 12 | +15 | 3 |
| | 0.09 | | | Yes | 21 | +15 | 3 |
| | 0.023 | | | No | | | |
| | 0.023 | Tetronic 904 | 0.25 | Yes | Very slow | <15 | <3 |
| | 0.023 | do | 0.09 | Yes | do | 0 | 0 |
| | 0.023 | Pluronic P-94 | 0.25 | Yes | do | <15 | <3 |
| | 0.023 | Aerosol OT | 0.25 | Yes | 7 | +15 | 10 |

TABLE 2

| Fluorochemical surfactant (FC) | FC conc, weight percent | Fluorine-free surfactant (FF) | FF conc, weight percent | Film | Film properties Speed (sec.) | Film properties Seal (sec.) | 50% burn-back (sec.) |
|---|---|---|---|---|---|---|---|
| $C_7F_{15}CONHC_3H_6N^+(C_2H_5)_3I^-$ | 0.36 | | | Very slight | Not covered | 0 | 0 |
| | 0.36 | Pluronic P-94 | 0.25 | Yes | Slow | +15 | 10 |
| | 0.36 | Tetronic 904 | 0.25 | Yes | do | 25 | 5 |
| | 0.36 | Ammonyx LO | 0.25 | Yes | Fast | 25 | 3 |
| $[C_7F_{15}CONHC_3H_6N^+(CH_3)_3]_2SO_4^=$ | 0.36 | | | Very slight | Not covered | 0 | 0 |
| | 0.36 | Pluronic P-94 | 0.25 | Yes | Fast | 3 | 0 |
| | 0.36 | Tetronic 904 | 0.25 | Yes | Fast | 25 | 15 |
| | 0.36 | Tergitol 7 | 0.25 | Yes | Medium | 3 | 3 |
| | 0.36 | Ammonyx LO | 0.25 | Yes | Slow | +15 | 9 |
| $C_8F_{17}SO_2N(C_2H_5)C_2H_4OP(OH)_2$ | 0.36 | | | Very slight | Not covered | 0 | 0 |
| | 0.36 | Pluronic P-94 | 0.25 | Yes | Slow | 0 | 0 |
| | 0.36 | Renex 31 | 0.25 | Yes | Fast | 0 | 0 |
| $C_7F_{15}CONHC_3H_6N(CH_3)_2C_2H_4COO$ including about 0.03% $C_7F_{15}COOH \cdot N(CH_3)_2C_3H_6NHC_2H_4COOH$ | 0.36 | Tetronic 904 | 0.25 | Yes | Fast | +15 | 15 |
| | 0.36 | Ammonyx SO | 0.25 | Yes | Slow | +15 | 25 |

NOTE.—Tetronic 904 is an ethylene diamine-propylene oxide-ethylene oxide adduct having the structural formula:

with an ethylene oxide content of 40 percent and a molecular weight of 7,500.

Examination of Table 1 will show that although the fluorochemical surfactant is capable of forming a fair film at relatively high concentrations, a superior film is formed at a concentration level where no film was formed by the aqueous fluorochemical surfactant solution by the addition of an anionic fluorine-free surfactant, viz., Aerosol OT. The addition of other fluorine-free surfactants at the no-film concentration of the

TABLE 3

| Fluorine-free surfactant | Emulsification time (sec.) | Film | Film properties Speed (sec.) | Film properties Seal (sec.) | 50% burn-back (sec.) |
|---|---|---|---|---|---|
| Pluronic L-62 | 20 | Yes | 16 | +30 | 3 |
| Pluronic P-105 | 15 | Yes | 32 | 24 | 2 |
| Pluronic L-72 | 5 | Yes | 16 | +30 | 6 |
| Pluronic P-94 [1] | 10 | Yes | 20 | +30 | 9 |
| Triton X-100 | 15 | Yes | 21 | +30 | 2 |
| Triton N-128 | 15 | Yes | 16 | 25 | 2 |

TABLE 3 — Continued

| Fluorine-free surfactant | Emulsification time (sec.) | Film | Film properties | | 50% burnback (sec.) |
|---|---|---|---|---|---|
| | | | Speed (sec.) | Seal (sec.) | |
| Aerosol OT | <5 | Yes | 13 | 10 | 6 |
| Nonic 218 | 30 | Yes | 60 | 25 | 13 |
| Renex 31 | 15 | Yes | 15 | 25 | 7 |
| Tergitol 7 | 10 | Yes | 55 | 4 | 3 |
| Pluronic L-42 | >200 | Yes | 45 | +30 | 17 |
| Pluronic F-77 | >200 | Yes | 45 | 18 | 7 |
| Pluronic F-68 | >200 | Yes | >60 | 0 | 0 |
| Pluronic F-38 | >200 | No | | 0 | 0 |
| Pluronic F-108 | >200 | Yes | >60 | 0 | 0 |
| Aerosol AY | >200 | No | | 0 | 0 |
| Aerosol MA | >200 | No | | 0 | 0 |
| Sulfo betaine DC | >200 | No | | 0 | 0 |
| Triton X-67 | >200 | Yes | >60 | 0 | 0 |

[1] Pluronic P-94 at 0.15%.

As earlier noted, compositons according to the present invention were formulated with and without a stabilizer component. The following Table 4 graphically demonstrates the reinforcing effect of the stabilizer component in the characteristics of the formed films. The formulation for the compositions reported in this Table 4 included the components in the stated quantities, the remainder being water.

The film-promoting fluorine-free surfactant must be water-soluble in order to be satisfactorily applied, although, of course, an insoluble excess over a truly soluble amount can be dispersed within an aqueous carrier to be subsequently dissolved, for example, on dilution of a concentrate to the final film-forming solution. For convenience, however, the fluorine-free surfactant should be water-soluble to at least about 0.02 percent by weight in water at 25° C., preferably 0.2 percent by weight. Insufficient solubility in the fuel phase results in no improvement in the spreading characteristics of the film-forming fluorochemical surfactant-fluorine-free surfactant aqueous solution, i.e., the fluorine-free surfactant must be hydrocarbon-congruous. On the other hand, if the fluorine-free surfactant is too soluble in the hydrocarbon fuel phase relative to the water phase, it will be rapidly removed and the film will collapse too rapidly to be useful. Suitable fluorine-free surfactants are characterized not so much by the absolute solubility of the material in the hydrocarbon fuel phase, as by the distribution of the material between the hydrocarbon fuel phase and the aqueous phase. As used herein, the term "fluorine-free" refers to a compound which is free of fluoroaliphatic radicals and contains no more than at most, five percent carbon-bonded fluorine by weight.

In addition to being water-soluble and hydrocarbon-congruous, as earlier noted, the organic fluorine-free film-promoting surfactant of the present invention is also synthetic and imputrescible. Since the compositions of the present invention are intended to be stored, either in concentrate form or as dilute aqueous solutions, for extended periods under varying environmental conditions it is highly desirable that the fluorine-free surfactant component be non-putrifying to insure storage stability of the composition and, secondarily, provide for odor-free compositions in use. It has been found that certain synthetic organic compounds possess these qualities in addition to other qualities hereinbefore and hereafter set forth.

One method for selecting suitable fluorine-free surfactants is the determination of the efficiency of the surfactants in promoting aqueous emulsions of hydrocarbons in water. The test can be carried out very simply by adding to a standard container equal volumes of

TABLE 4

| FC surfactant | Conc., weight percent | FF surfactant | Conc., weight percent | Stabilizer | Conc., weight percent | Film properties | | 50% burnback (sec.) |
|---|---|---|---|---|---|---|---|---|
| | | | | | | Speed (sec.) | Seal (sec.) | |
| $C_8F_{17}SO_2N(C_2H_5)C_2H_4OP(OH)_2$ $\parallel$ O | | Pluronic P-94 | 0.36 | | | 45 | 45 | 0 |
| | | do | 0.36 | $C_4H_9OC_2H_4OC_2H_4OH$ | 0.15 | 25 | 135 | 8 |
| $C_8F_{17}SO_2N(C_2H_5)CHCO_2K$ | | $C_{11}H_{23}CON(CH_2CH_2OH)_2$ | 0.36 | do | 0.15 | 3 | 95 | 7 |
| | | $C_{11}H_{23}CON(CH_2CH_2OH)_2$ | 0.36 | do | 0.15 | 4 | 135 | 16 |
| $C_7F_{15}CONHC_2H_4N^+(C_2H_5)_3I^-$ | | Tetronic 904 | 0.36 | Polyox N-10 | 0.56 | 4 | 145 | 7 |
| $C_7F_{15}CO_2H\cdot(CH_3)_2NC_2H_4NHC_2H_4CO_2H$ | | Tetronic 904 | 0.03 | | | 3 | 200 | 14 |
| $C_7F_{15}CONHC_2H_4N(CH_3)_2NC_2H_4NHC_2H_4CO_2H$ | | Pluronic F-77 | 0.03 | Polyox N-10 | 0.25 | 2 | 685 | 15 |
| $C_7F_{15}CO_2H\cdot(CH_3)_2NC_2H_4NHC_2H_4CO_2$ | | Pluronic F-77 | 0.03 | | | 3 | +1,500 | 11 |
| $C_7F_{15}CO_2H\cdot(CH_3)_2NC_2H_4NHC_2H_4CO_2$ | | Pluronic F-77 | 0.36 | $C_4H_9OC_2H_4OC_2H_4OH$ | 0.25 | 4 | +1,500 | 11 |
| $C_7F_{15}CONHC_2H_4N(CH_3)_2NC_2H_4NHC_2H_4CO_2H$ | | Pluronic F-77 | 0.03 | Polyox N-10 | 0.25 | | | 11 |
| $C_7F_{15}CO_2H\cdot(CH_3)_2NC_2H_4NHC_2H_4CO_2$ | | Pluronic F-77 | 0.36 | $C_4H_9OC_2H_4OC_2H_4OH$ | 0.25 | 4 | +1,500 | 26 |
| $C_7F_{15}CONHC_2H_4N(CH_3)_2C_2H_4CO_2$ | | Renex 31 | 0.36 | $C_4H_9OC_2H_4OC_2H_4OH$ | 0.016 | 2 | 10 | NR |
| $C_7F_{15}CO_2H\cdot(CH_3)_2NC_2H_4NHC_2H_4CO_2H$ | | do | 0.36 | Polyox N-10 | 1.6 | 1 | 17 | NR |
| $C_7F_{15}CONHC_2H_4N(CH_3)_2NC_2H_4NHC_2H_4CO_2H$ | | do | 0.36 | do | 0.15 | 1 | 90 | NR |
| $C_7F_{15}CONHC_2H_4N(CH_3)_3\rightarrow O$ | | do | 0.36 | do | 0.3 | 1 | 140 | NR | a test hydrocarbon, such as cyclohexane, and water together with a small amount of the fluorine-free surfactant to be tested. Agitation is started at a standard rate and the time determined at which the two-phase system acquires the high turbidity characteristics of an oil-in-water dispersion. Since the change from the coarse mixture to the uniform dispersion takes place over a very short period of time, this test develops into a very precise measurement. In general, fluorine-free surfactants which, under the below noted standard test conditions, provide an emulsion in 200 seconds or less also act to promote formation and spreading of films of fluoroaliphatic surfactantwater solutions on hydrocarbon substrates.

The test is carried out in a 100 ml. beaker, 5 cm. in diameter × 6.5 cm. in height, equipped with a conventional magnetic stirrer bar 2.5 cm. in length and 0.95 cm. in average diameter. The stirrer used is obtainable from the Chicago Apparatus Co. under the tradename "Magnastir." For each of the tests, 15 ml. each of distilled water and cyclohexane were used together with 0.25 percent by weight of the particular fluorine-free surfactant to be tested according to the following procedure:

1. The water phase consists of distilled water containing 0.25 percent by weight of the fluorine-free surfactant to be tested.

2. The water phase is placed in the beaker followed by the careful addition of the cyclohexane phase.

3. The stirrer bar is introduced and rotated at a speed of 1250 ± 250 rpm.

4. By using a light focused into the solution, the time in which an emulsion is formed is tested — this is indicated by a change in color from clear to white.

Table 5

| Fluorine-Free Surfactant | Emulsion time Seconds |
|---|---|
| 1. $C_4H_9CH(C_2H_5)C_2H_4CH(SO_4Na)C_2H_4CH(C_2H_5)_2$ (Tergitol 7, Union Carbide Chemical Co.) | 10 |
| 2. Polyoxyethylene ether alcohol (Renex 31; Atlas Powder Co.) | 15 |
| 3. Stearyl dimethyl amine oxide | 200+ |
| Cetyl dimethyl amine oxide | 200+ |
| 5. Lauryl dimethyl amine oxide | 200+ |
| 6. Myristyl dimethylamine oxide | 120 |
| 7. Alkyl aryl sulfonate (Nacconol NR; Allied Chemical Corp.) | 150 |
| 8. Dioctyl sodium sulfosuccinate | 25 |
| 9. Dihexyl sodium sulfosuccinate | 195 |
| 10. Diamyl sodium sulfosuccinate | 198 |
| 11. $C_{12}H_{25}N(CH_3)_2CH_2CH_2SO_3$ | 199 |
| 12. $t\text{-}C_{12}H_{25}S(C_2H_4O)_{8\text{-}10}''$ | 30 |
| 13. Ammonium alkyl phenoxy polyoxyethylene sulfate (Alipal CO 436; General Aniline and Film Corp.) | 30 |
| 14. Amphoteric fatty acid amido complex (Antaron FC; General Aniline and Film Corp.) | 25 |
| 15. Phosphate ester of a higher fatty alcohol mixture (Gafac RS 710; General Aniline and Film Corp.) | 15 |
| $C_{11}H_{23}CO_2N(CH_2CH_2OH)_2$ | 30 |
| 17. Alkoxy polyoxyethylene oxyethanol (Triton X 67 Rohm and Haas Co.) | 200+ |
| Octylphenoxy polyoxyethylene oxyethanol (Triton X 100 Rohm and Haas Co.) | 15 |
| 19. Nonyl phenoxy polyoxyethyleneoxy ethanol (Triton N 128 Rohm and Haas Co.) | 15 |
| 20. Sulfonated aliphatic hydrocarbon oil (Calsolene Oil RS: Imperial Chemical Industries | 200+ |
| 21. Polyoxyethylene Esters of Mixed aliphatic carboxylic acids - Oil Soluble Hydrocarbon sulfonates (Witco 912; Witco Chemical Co.) | 200+ |
| 22. Tetronic 904 | 60 |

Another convenient method for selecting suitable fluorine-free surfactants is determined by the Film Formation and Spreading Test, above described. Those fluorine-free surfactants which, when added to non-film-forming fluorocarbon surfactant solutions cause the resulting solutions to form films which spread over the surface of the cyclohexane in 60 seconds or less have been found to be satisfactory film-forming promoters.

A third and generally more convenient test for selecting suitable fluorine-free surfactants has recently been developed. Surfactants passing this modified emulsion test are found to form vapor-suppressing films on the surface of cyclohexane, generally within a time of about sixty seconds or less.

The present modified emulsion test consists of placing, in a 23 × 85 mm vial, 10 ml of cyclohexane and 10 ml of a 1 percent (or 10 percent) by weight aqueous solution of the test fluorine-free surfactant. The vial is then shaken vigorously for 25 complete cycles, allowed to settle for 30–60 minutes, and the contents examined.

Three resulting situations are recognized:

1. Two clear phases, a cyclohexane upper layer and a lower water layer.

2. Three phases consisting of an upper cyclohexane layer, a lower water layer, and an intermediate layer which is an emulsion.

3. Either *a*) a single emulsion phase or *b*) a combination of one clear phase, either cyclohexane or water, and an emulsion phase.

When this step of the emulsion test fails to produce at least one completely emulsified phase with a 1 percent surfactant solution, the concentration is increased to 10 percent, the test repeated, and the results observed.

In the first two situations, where both a clear aqueous and a clear cyclohexane phase are found, the test surfactant is not useful and will generally fail to provide a suitable film on cyclohexane.

Where at either concentration at least one of the phases has become substantially completely emulsified, the test surfactant is useful and will generally, in combination with a compatible fluoroaliphatic surfactant, under laboratory or field conditons, provide a vapor-suppressing aqueous film on a volatile hydrocarbon surface.

The film formation test was carried out in a 140 mm Petri dish containing a thin layer of cyclohexane. Test surfactants were dissolved in water also containing 0.5 percent by weight of a compatible fluoroaliphatic surfactant and 3 percent of butoxy hydroxy-ethoxy ethane ("Butyl Carbitol"). As indicated in Table 6, which represents a cross-section of materials tested, the concentration of test surfactants varied, some being adequately effective at lower concentrations than others.

Five drops of the aqueous solution were placed at the approximate center of the cyclohexane surface and the spreading of the film observed. No particular effort was made to find the optimum fluoroaliphatic surfactant or to determine the minimum effective concentration, since the data serve primarily to establish the correlation between emulsifying surfactants and film-formation.

In the Table, the test surfactants are grouped according to class, and generally from smaller to larger molecular weight in a series. The first column shows the composition of the surfactant, according to the best available information. (Since these are commercial materials, the composition given may be that of the major component or represent an average of a number of components.) The second column identified the material by trade name where applicable. The third and fourth columns indicate the emulsification test results at, respectively, 1 percent and/or 10 percent concentration of the fluorine-free surfactant. A "+" indicates essentially complete emulsification of at least one of the initial phases.

The fifth column designates the compatible fluoroaliphatic surfactant used in the film forming evaluation, abbreviated as follows:

$P - C_8F_{17}SO_2N(C_2H_5)C_2H_4OPO(OH)_2$ $Q - \begin{cases} C_8F_{17}SO_2NHC_3H_6N(CH_3)_3I & 80 \text{ percent} \\ C_8F_{17}SO_2NHC_3H_6N(CH_3)_3Cl & 20 \text{ percent} \end{cases}$ $S - C_8F_{17}SO_2N(C_2H_5)C_2H_4OSO_3Na$ The sixth column indicates the concentation of fluorine-free surfactant in the aqueous solution.

The final column indicates the results of the film test. Satisfactory surfactants form films that cover the entire surface in about 60 seconds or less, and are designated "+"; failure to form a film at reasonable concentrations or formation of a film at an undesirably slow rate, is indicated by "—".

Thus, examination of Tables 3 and 6 will reveal that the fluorine-free surfactants which promoted the formation of useful vapor suppressing films had (1) emulsification times of 200 seconds or less, or (2) resulted in solutions which formed films which spread over the cyclohexane surface in 60 seconds or less, or (3) formed either (a) a single emulsion phase or (b) a combination of one clear phase (cyclohexane in water) and an emulsion phase.

Characteristically, addition of a water soluble electrolyte such as sodium chloride, magnesium sulphate and the like, to an aqueous surfactant solution tends to decrease the solubility of surfactants and not infrequently causes the surfactants to precipitate. Surprisingly, it has been found that the presence of an electrolyte dissolved in the water (even at concentrations as high as 7 percent by weight or more) does not decrease the efficiency of these fluorine-free surfactant-fluoroaliphatic surfactant solutions. In many cases, it actually improves the film-spreading characteristics. Not only does this simplify the requirements for diluent water in making up film-forming solutions for applications to fuel surfaces, but it allows the use of these mixed surfactant solutions, for example, on ships at sea where the only convenient diluent water available is sea water with its relatively high salt content.

In certain applications, especially where corrosion of the fire-fighting apparatus may be a factor, it would be

TABLE 6

| Structure | Name + | Emulsification 1% | Emulsification 10% | FC | Film percent HC | Cover |
|---|---|---|---|---|---|---|
| $C_7H_{15}CO_2Na$ | | — | — | P,S | 0.1–2 | — |
| $C_{13}H_{27}CO_2Na$ | | + | | S | 0.5 | + |
| $C_{17}H_{33}CON(CH_3)CH_2CO_2Na$ | Sarcosyl O | — | + | Q | 0.15 | + |
| $C_{17}H_{35}CON(CH_3)CH_2CO_2Na$ | Sarcosyl S | + | | P | 0.1 | + |
| $C_{18}H_{37}SO_3Na$ | Alkanol 189-S | — | + | P | 0.25 | + |
| $CH_3C_6H_4SO_3K$ | Stepanate K | — | — | P,S | 0.1–2 | — |
| $C_{12}H_{25}C_6H_4OC_6H_3(SO_3Na)_2$ | Benax 2A1 | + | | P | 0.25 | + |
| $C_8H_{17}OSO_3Na$ | Sipex OLS | — | — | P | 2.0 | + |
| $C_{12}H_{25}OSO_3Na$ | Sipon WD | + | | P | 0.25 | + |
| $C_{18}H_{37}N(CH_2CH_2CO_2Na)_2$ | Deriphat 154 | + | | S | 0.15 | + |
| $C_{12}H_{25}N(CH_3)_2(CH_2)_2SO_3$ | Sulfobetaine DLH | + | | S | 0.25 | + |
| $C_8H_{17}O_2CCH_2CH(CO_2C_8H_{17})SO_3Na$ | Aerosol OT | + | | P | 0.25 | + |
| $C_{11}H_{23}CON(CH_3)C_2H_4SO_3Na$ | Igepon TC 42 | + | | P | 0.50 | + |
| $C_{12}H_{25}(OC_2H_4)_NOSO_3NH_4$ | Sipon EAY | + | | P | 0.25 | + |
| $(C_8H_{17}O)_2PO_2Na$ | Tergitol P 28 | + | | S | 0.25 | + |
| $C_{12}H_{25}N(C_2H_4OH)_2O$ | Aromox C 12 | + | | Q | 0.1 | + |
| $C_{12}H_{25}N(CH_3)_3Cl$ | Arquad 12-50 | + | | Q | 0.10 | + |
| $(C_{12}H_{25})_2N(CH_3)_2Cl$ | Arquad 20-75 | — | | Q | 0.10 | + |
| $C_{17}H_{35}CONHC_3H_6N(CH_3)_2C_2H_4OHNO_3$ | Catanac SN | + | | Q | 0.10 | + |
| For pluronic structures see Table 8 | Pluronic L 31 | — | + | P | 0.50 | + |
| | Pluronic L 61 | — | + | P | 0.50 | + |
| | Pluronic L 64 | + | | P | 0.50 | + |
| | Pluronic F 68 | + | | P | 0.50 | + |
| | Pluronic P 94 | + | | P | 0.50 | + |
| | Pluronic F 108 | + | | P | 0.50 | + |
| | Pluronic L 121 | + | | P | 0.50 | + |
| For tetronic structures see Table 2: | | | | | | |
| x=13, y=7 | Tetronic 304 | — | + | P | 0.25 | + |
| x=47, y=146 | Tetronic 707 | + | | P | 0.50 | + |
| x=65, y=75 | Tetronic 904 | + | | P | 0.50 | + |
| x=100, y=300 | Tetronic 1307 | — | — | P,Q | 0.5 | — |
| x=115, y=100 | Tetronic 1504 | + | | Q | 0.50 | + |
| $C_8H_{17}C_6H_4OC_2H_4OH$ | Triton X 15 | — | — | P,Q | 0.1–1 | — |
| $C_8H_{17}C_6H_4O(C_2H_4O)_{10}H$ | Triton X 100 | + | | P | 0.25 | + |
| $C_9H_{19}C_6H_4O(C_2H_4O)_{100}H$ | Igepal CO 990 | + | | P | 0.50 | + |
| $C_{18}H_{37}O(C_2H_4O)_{10}H$ | Brij 76 | — | — | P,Q | 0.5 | — |
| $C_{17}H_{35}CO_2CH_2CHOHCH_2OH$ | Aldo MS | + | | P | 0.20 | + |
| $(C_{17}H_{33}CO_2)_3C_3H$ | Emerest 2423 | — | | P | 0.50 | — |
| $C_{13}H_{27}CO_2C_6H_{13}O_5$ | Span 40 | + | | P | 0.50 | + |
| $C_{17}H_{35}CO_2C_6H_{12}O_4(OC_2H_4)_4OH$ | Tween 61 | + | | P | 0.05 | + |
| $(C_{17}H_{35}CO_2)_3C_6H_{11}O_3$ | Span 65 | — | + | Q | 2.50 | + |
| $(C_{17}H_{35}CO_2)_3C_6H_{10}O_2(OC_2H_4)_{20}OH$ | Tween 85 | — | — | P | 0.50 | — |
| $C_{12}H_{25}N(C_2H_4OH)_2$ | Ethomeen C 12 | + | | Q | 0.10 | + |
| $C_{12}H_{25}N[(C_2H_4O)_5H]_2$ | Ethomeen C 20 | + | | Q | 0.10 | + |
| $C_{18}H_{37}N[(C_2H_4O)_{25}H]_2$ | Ethomeen 1860 | + | | P | 0.20 | + |
| $C_{11}H_{23}CON(C_2H_4OH)_2$ | Gafamide CD 115 | + | | P | 1.50 | + |
| $C_{16.7}H_{34.4}CON[(C_2H_4O)_{25}H]_2$ | Ethomid HT 60 | — | | P | 0.50 | — |
| $C_{18}H_{35}N(CH_3)(C_2H_4OH)_2Cl$ | Ethoquad 012 | + | | Q | 0.10 | + |
| $C_{11}H_{23}CO_2(C_2H_4O)_3H$ | Pegosperse 100L | — | — | P | 0.50 | — |
| $C_{11}H_{23}CO_2(C_2H_4O)_9H$ | Hodag 40L | + | | P | 0.50 | + |
| $C_{17}H_{35}CO_2(C_2H_4O)_{14}H$ | Emerest 2660 | + | | P | 0.50 | + |
| $C_{17}H_{35}CO_2(C_2H_4O)_{40}H$ | Hodag 150-S | + | | Q [1] | 0.25 | + |

[1] Indicates that the film test was carried out with a film spreading solution containing 0.75 weight percent surfactant Q and 4.5 weight percent "Butyl Carbitol".

desirable to have a slightly alkaline concentrate. One such film-forming alkaline concentrate embodying the teachings of the present invention was prepared having the following formulation and a pH of 9.0

$$\underset{C_6F_{13}SO_2NC_3H_6N^+(CH_3)_3}{CH_2COO^-} \quad 4.0 \text{ parts}$$

$$\underset{C_8F_{17}SO_2NCH_2COO^-K^+}{C_2H_5} \quad 2.0 \text{ parts}$$

| | |
|---|---|
| $C_4H_9O(CH_2CH_2O)_2H$ (Butyl Carbitol) | 25.0 parts |
| Pluronic F-77 | 5.0 parts |
| $N(CH_2CH_2OH)_3$ | 1.5 parts |
| Deionized water | 62.5 parts |

This concentrate, diluted with sixteen parts of fresh or sea water, when applied as an expanded foam to a 28 square feet aviation gasoline fire, produced the following results:

| | Diluent | |
|---|---|---|
| | Fresh Water | Sea Water |
| Extinguishment Time (Sec.) | 41 | 49 |
| 25% Burnback Time (Sec.) | 360 | 294 |

The foregoing results, when viewed against specifications for fire-fighting foam established by the U.S. Navy, are quite impressive, MIL-F-24385 requires an extinguishment time of less than 84 seconds and a 25 percent burnback time of greater than 240 seconds.

Another film-forming alkaline concentrate (pH of rine-containing surfactants is higher for those fluorine-free surfactants which are more soluble in hydrocarbon fuels; also, higher concentrations of fluorine-free surfactants are used where the aqueous diluent will contain higher concentrations of ionic materials. Either the fluoroaliphatic or the fluorine-free surfactant or both may consist of a mixture of two or more surface active materials.

The following Table 7 shows representative formulations embodying the teachings of the present invention. The following base stock solution was used for each formulation:

| | |
|---|---|
| Polyoxyethylene glycol, average MW 90,000 (Polyox N-10) | 9.0 parts |
| $CH_3CO_2H$ | 0.5 parts |
| $HOC_2H_4OH$ | 30.0 parts |
| $H_2O$ | 60.5 parts |

Test solutions were prepared by adding to the base stock the required amount of fluoroaliphatic surfactant and fluorine-free surfactant and diluting 6 ml of the resulting solution with 94 ml of either distilled water or "sea water," as indicated. The "sea water" is a synthetic salt mixture as defined by ASTM Test Method D 1141-52 dissolved in distilled water to a concentration of 42 grams per liter.

The fluoroaliphatic surfactant for this table is a mixture of 11.6 parts of $C_7F_{15}CONHC_3H_6N^+(CH_3)_2C_2H_4CO_2^-$ and 1 part of $C_7F_{15}CO_2H \cdot N(CH_3)_2C_3H_6NHC_2H_4CO_2H$.

TABLE 7

| Diluent | Fluorine-free surfactant | Concentration, weight percent | | Speed (sec.)[1] | Seal (sec.) | Agitation resistance (sec.) | 50% burn back (sec.) |
|---|---|---|---|---|---|---|---|
| | | Fluoro-aliphatic surfactant | Fluorine-free surfactant | | | | |
| Water | | 0.36 | | 15 | +30 | 10 | 3 |
| Do | Pluronic P-94 [2] | 0.36 | 0.25 | 3 | +30 | +15 | 2 |
| Do | Pluronic L-42 | 0.36 | 0.50 | 5 | +30 | +15 | 42 |
| Do | Pluronic L-64 | 0.36 | 0.50 | 3 | +30 | +15 | 21 |
| Do | | 0.25 | | NC[3] | +30 | 7 | 3 |
| Do | Pluronci F-77 | 0.25 | 0.18 | 15 | +30 | +15 | 13 |
| Do | Pluronic L-42 | 0.25 | 0.50 | 3 | +30 | +15 | 30 |
| Do | | 0.18 | | NC | +30 | 10 | |
| Do | Pluronic L-42 | 0.18 | 0.50 | 12 | +30 | +15 | 30 |
| Do | Pluronic L-64 | 0.18 | 0.50 | 8 | +30 | +15 | 20 |
| Do | | 0.12 | | NC | 0 | 0 | 0 |
| Do | Pluronic L-42 | 0.12 | 0.50 | NC | +30 | 9 | 7 |
| Do | Pluronic L-64 | 0.12 | 0.50 | NC | +30 | +15 | 0 |
| Do | Pluronic L-77 | 0.12 | 0.25 | NC | +30 | 3 | 3 |
| Do | | 0.36 | | 12 | +30 | NR | 9 |
| Sea water | | 0.36 | | NC | 0 | NR | 0 |
| Water | Renex 31 [4] | 0.36 | 0.25 | 2 | +30 | NR | 36 |
| Sea water | Renex 31 | 0.36 | 0.25 | 1 | +30 | NR | 3 |
| Water | $C_{12}H_{25}N(CH_3)_2C_2H_4SO_3$ | 0.36 | 0.36 | 30 | 10 | NR | 9 |
| Sea water | $C_{12}H_{25}N(CH_3)_2C_2H_4SO_3$ | 0.36 | 0.36 | 4 | +30 | NR | 7 |
| Water | Pluronic P-94 | 0.36 | 0.25 | 2 | +30 | NR | 20 |
| Sea water | Pluronic P-94 | 0.36 | 0.25 | 2 | +30 | NR | 15 |
| Water | Pluronic L-77 | 0.36 | 0.25 | 3 | +30 | NR | 4 |
| Sea water | do | 0.36 | 0.25 | 1 | +30 | NR | 30 |

[1] The violent agitation used in the Agitation Resistance test disrupts the film. When the Burnback Test immediately follows the Agitation Resistance Test the times are therefore relatively shorter than when the Agitation Test is not run (NR).
[2] Pluronic is a Trademark of Wyandotte Chemical Co., Wyandotte, Michigan. The composition of the indicated members of the series is believed to be as described in Table 8, following.
[3] The symbol "NC" indicates that the film from 5 drops of solution does not expand to completely cover the surface of the hydrocarbon under Test conditions, although 20 drops forms a complete seal.
[4] Renex-31 is a Trademark of Atlas Powder Co., Wilmington, Delaware, for a liquid polyoxyethylene ether alcohol nonionic surfactant.

8.0) which met the requirements of the present invention had the following formulations:

| | |
|---|---|
| $C_8F_{17}SO_2NHCH_2C_6H_4SO_3Na$ | 6.0 parts |
| Butyl Carbitol | 25.0 parts |
| $C_{12}H_{25}OSO_3Na$ (Sipon WD) | 5.0 parts |
| Deionized Water | 64.0 parts |

In general, the ratio of fluorine-free surfactant to fluorocarbon surfactant is not critical. Weight ratios of 1:25 to 10:1 are satisfactorily used, although the more usual weight ratio falls between 1:15 to 5:1. Generally speaking, the ratio of fluorine-free surfactants to fluo- Although anionic, cationic, amphoteric and nonionic fluorine-free surfactants are generally useful in the mixtures of this invention, it is particularly convenient to use nonionic fluorine-free surfactants because they are relatively insensitive to the effects of fluoroaliphatic surfactant structure or the ionic concentration of the aqueous solution and furthermore, are available in a wide range of relative solubilities, making easy the selection of appropriate materials. One class of nonionic fluorine-free surfactant which has proven particularly useful consists of the high molecular weight block copolymers of polyethylene oxide and polypropylene oxide (Pluronics). Of this class, those with a polyethylene oxide content of 20 percent to 70 percent generally perform better than those with more or less polyethylene oxide. Those materials with a polypropylene oxide block of 1,750 to 3,250 molecular weight also show generally better performance than those with higher or lower block of molecular weights. The following Table 8 lists some properties of his particular class of fluorine-free surfactants.

Table 8

Properties of Pluronic Surfactants
Pluronics are $HO(C_2H_4O)_a(C_3H_6O)_b(C_2H_4O)_cH$ — block copolymers made by Wyandotte Chemical Corp.

| Pluronic No. | $C_2H_4O$ % | $(C_3H_6O)_b$ M.W. | Emulsion Time Seconds |
|---|---|---|---|
| L-31 | 10 | 950 | 200+ |
| L-35 | 50 | 950 | 200+ |
| F-38 | 80 | 950 | 200+ |
| L-42 | 20 | 1200 | 200+ |
| L-44 | 40 | 1200 | 200+ |
| L-61 | 10 | 1750 | 15 |
| L-62 | 20 | 1750 | 20 |
| L-64 | 40 | 1750 | 5 |
| F-68 | 80 | 1750 | 200+ |
| L-72 | 20 | 2050 | 5 |
| P-75 | 50 | 2050 | 15 |
| F-77 | 70 | 2050 | 200+ |
| L-81 | 10 | 2250 | 10 |
| P-85 | 50 | 2250 | 15 |
| F-88 | 80 | 2250 | 200+ |
| L-92 | 20 | 2750 | NR |
| P-94 | 40 | 2750 | 10 |
| F-98 | 80 | 2750 | 200+ |
| L-101 | 10 | 3250 | NR |
| L-103 | 30 | 3250 | 40 |
| P-105 | 50 | 3250 | 15 |
| F-108 | 80 | 3250 | 200+ |
| L-121 | 10 | 4250 | NR |
| L-122 | 20 | 4250 | NR |
| F-127 | 70 | 4250 | NR |

In an effort to test the efficacy of a composition of the present invention on a large scale fire, a fire-fighting composition was formulated as follows:

| | |
|---|---|
| $C_6F_{13}SO_2NHC_3H_6N(CH_3)_2 \rightarrow O$ | 4.0 parts |
| $C_6F_{13}SO_2NHC_3H_6N(CH_3)_2$ | 2.0 parts |
| Renex 31 | 0.5 parts |
| Butyl carbitol | 25.0 parts |
| Acetic acid | 1.5 parts |
| Water | 67.0 parts |

This concentrate, diluted with sixteen parts water, was found to have a film speed of 15 seconds and a seal time of 180 seconds when tested on the surface of heptane.

The thus diluted aqueous solution was then comparatively tested on a 400 square feet (circular) white marine gasoline fire against the first composition shown in Table 7 which contained no fluorine-free surfactant. The test conditions and results were as follows:

Wind condition: 3 to 8 mph, gusting to 12 mph
Fuel: 150 gallons of white marine gasoline over 2–3 inches of water. Fuel is ignited and allowed to burn for 15 seconds before extinguishment process is initiated
Application equipment: Air aspirating foam nozzle operating at 100 psi and delivering 16 gals/min.
Solution used: 30 gallons
Total application time: 100 seconds

| | FC Surfactant Solution | FC-FF Surfactant Solution |
|---|---|---|
| Time to Extinguishment | 80 seconds | 70 seconds |
| Burnback | | |
| 10% | 45 seconds | 360 seconds |
| 25% | 75 seconds | 405 seconds |
| 50% | 115 seconds | 420 seconds |

The foregoing large scale fire test results show, quite vividly, the effect achieved by the combination of the fluoroaliphatic surfactant and the "Renex 31" water-soluble synthetic imputrescible organic fluorine-free surfactant. Thus, it will be observed that burnback times with the composition of the present invention are at least 3 to 6 times greater than the burnback times of the solution containing only a fluoroaliphatic surfactant. Burnback times are quite critical in fighting petroleum fed fires, particularly those involving aircraft, since rescue personnel are dispatched through the flame-extinguished areas at the earliest possible opportunity to effect personnel rescue. Obviously, the lives of the rescue personnel would be endangered if the fire-fighting composition did not afford a significant burnback time.

A primary limitation of previously known fire-fighting solutions involving fluorochemical surfactants and water, such as those described in Tuve and Jablonski U.S. Pat. No. 3,258,423, is that the fluorochemical component is used to provide both foaming and film-forming capability. This severely limits the choice of material which can be used. The present invention allows surfactant materials to be selected primarily on their ability for forming excellent vapor barrier films on fuel surfaces. If, in addition, foaming characteristics are desired, as for fire-fighting purposes, a foaming agent can be selected primarily on the basis of its foam producing and foam stability characteristics and used in conjunction with the film-forming agent. This foaming agent may be a fluorochemical surfactant, such as the perfluoroaliphatic carbonamido betaine suggested by Tuve and Jablonski or it may be a non-fluorinated foaming agent. One such common non-fluorinated foaming agent is the protein hydrolysate used to form the well known commercially available "protein foam" concentrates. Protein foam concentrates are well-known materials for producing aqueous foams in fire-fighting. Their preparation, formulation and use is described in the article, Fire-fighting Foams by J. M. Perri, page 189 of FOAMS-THEORY AND INDUSTRIAL APPLICATIONS, edited by J. J. Bikerman, Reinhold Publishing Corporation, New York, 1953. The concentrates are prepared by hydrolyzing any waste protein product such as soybean meal, hoofs, hair, feathers, or fish scales in either aqueous acid or aqueous base. Calcium hydroxide is a frequently used hydrolytic agent. Hydrolysis is normally carried out until a 25–35 percent aqueous solution has a viscosity below 100 centistokes at −7° C. This concentrate is usually mixed with about 16 parts by volume of water and 150 parts of gas, usually air, at the time of application to the fire.

Film forming solutions containing only a fluoroaliphatic surfactant usually harm the efficiency of a protein foam system, the mixture resulting in a thin and unstable foam blanket. It has been found that film forming mixtures including a compatible fluorine-free surfactant do not significantly harm the effectiveness of a protein foam used therewith. For use in conjunction with protein foams, non-ionic fluorine-free surfactants are preferred in combination with a cationic fluorocarbon surfactant. In such uses, the protein foam-forming agent is normally used at 5 to 10 times by weight of the fluoroaliphatic surfactant and care must be taken to have the pH of the solution, either concentrate or final dispersion, within the range of 5 to 7 for optimum results.

The following Table 9 illustrates the flexibility which can be realized through the use of the teachings of the present invention in formulating foaming film forming compositions.

TABLE 9.—PROTEIN FOAM FORMULATIONS

| Fluorocarbon surfactant | Conc., percent | Fluorine-free surfactant | Conc., percent | Compatibility | Film properties Speed (sec.) | Seal (sec.) | 50% burn-back (sec.) |
|---|---|---|---|---|---|---|---|
| $C_7F_{15}CONHC_3H_6N(CH_3)_2 \rightarrow O$ | 0.18 | | | Clear | No film | | |
| | 0.12 | $[CH_2N[(C_3H_6O)_{19}(C_2H_4O)_{17}H]_2]_2$ | 0.03 | Cloudy | 18 | +15 | 4 |
| $C_7F_{15}CONHC_3H_6N(CH_3)_2C_2H_4CO_2$; | | | | Clear | 6 | +15 | 22 |
| $C_7F_{15}CO_2H \cdot N(CH_3)_2C_3H_6NHC_2H_4CO_2H$ | 0.36 | | | Cloudy | Very slow | 0 | 0 |
| 11.6:1. | 0.36 | $[CH_2N[(C_3H_6O)_{19}(C_2H_4O)_{17}H]_2]_2$ | 0.25 | Heavy residue | Slow | +15 | 19 |

Figure 1:
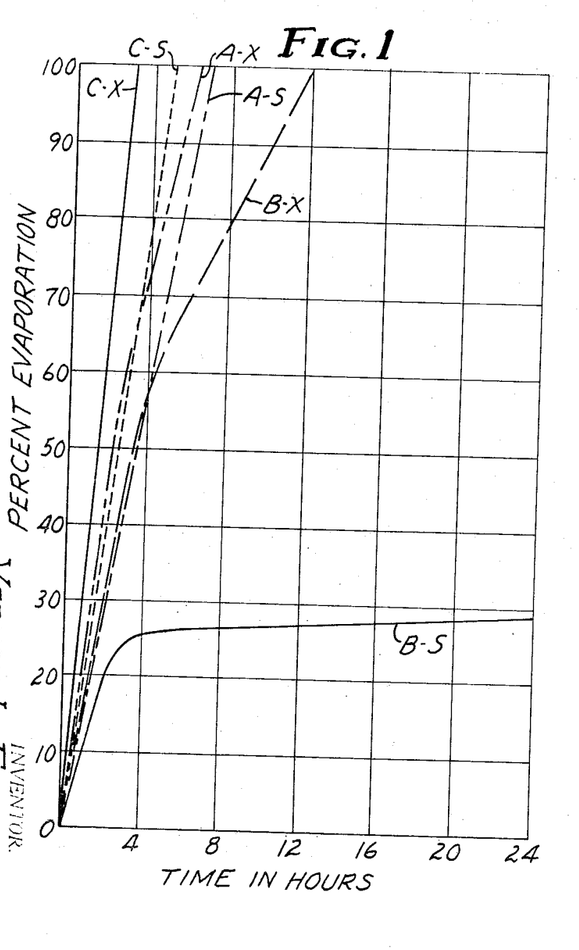

FIG. 1 is a graph which shows the relative evaporation rates of 25 grams of cyclohexane contained in a Petri dish measuring 5 cm. in diameter by 2.7 cm. in height. Curves A-S and A-X show the evaporation rate of the cyclohexane under static conditions (A-S) and with agitation of the cyclohexane for four fours (A-X) when 0.6 grams of a film-forming composition comprising 0.36 weight percent of $C_7F_{15}CONHC_3H_6N(CH_3)_2 \rightarrow O$ and water was placed on the cyclohexane surface. Curves B-S (static) and B-X (agitation) show the evaporation rate of the cyclohexane with a vapor barrier film according to the invention placed thereover — the film was formed with 0.6 gram of an aqueous composition comprising 0.36 weight percent of $C_7F_{15}CONHC_3H_6N(CH_3)_2 \rightarrow 0$ and 0.25 weight percent Pluronic P-94. Curves C-S (static) and C-X (agitation) show the loss by evaporation of the cyclohexane when 0.00216 gram of $C_7F_{15}CONCH_3H_6N(CH_3)_2 \rightarrow 0$ is mixed into the cyclohexane.

Figure 2:
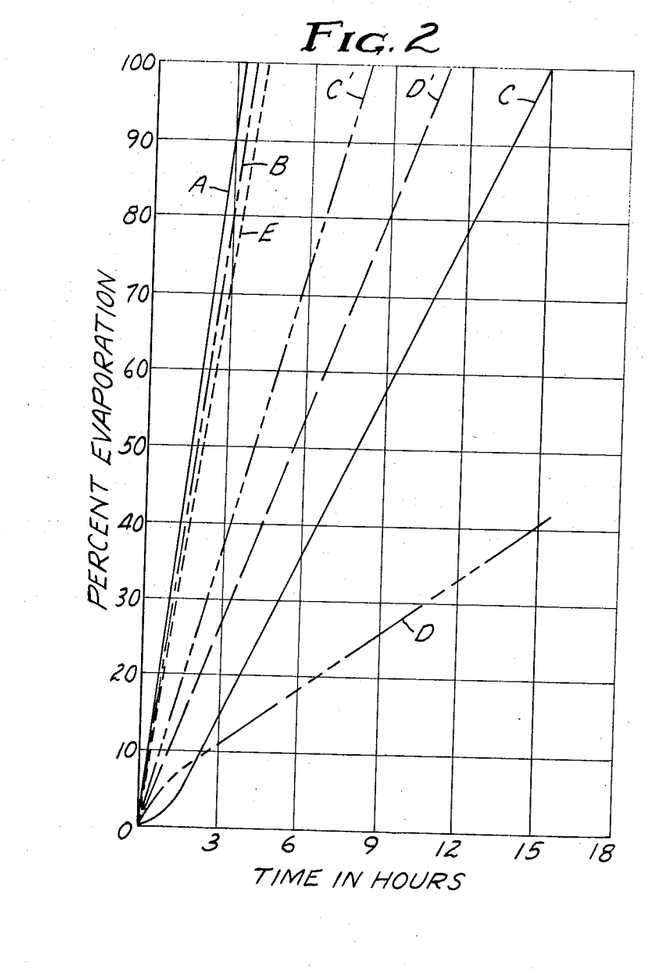

FIG. 2 is a graph which shows the rate of evaporation of a 25 grams sample of cyclohexane contained in a Petri dish measuring 5 cm. in diameter by 2.7 cm. in height. Curve A represents the evaporation loss of the cyclohexane with 0.6 gram of an aqueous solution of 0.25 weight percent Pluronic P-94 placed on the surface. Curve B represents the evaporation rate of pure cyclohexane. Curves C (static) and C' (agitation) show the evaporation rate of the cyclohexane with 0.6 gram of a 0.36 weight percent aqueous solution of $C_7F_{15}CONHC_3H_6N^+(C_2H_5)_3I^-$ placed on the surface of the cyclohexane. Curves D (static) and D' (agitation) show the evaporation rate of the cyclohexane when covered with a vapor barrier film formed with 0.6 gram of an aqueous film-forming composition comprising 0.36 weight percent $C_7F_{15}CONHC_3H_6N^+(C_2H_5)_3 I^-$ and 0.25 weight percent Pluronic P-94. Curve E represents the evaporation loss of the cyclohexane when 0.00216 gram of $C_7F_{15}CONHC_3H_6N^+(C_2H_5)_3I^-$ is mixed into the cyclohexane.

What is claimed is:

1. An aqueous concentrate composition useful for suppressing vaporization of liquid hydrocarbon comprising:

a. a film-forming component comprising a water soluble fluorinated surfactant of the formula $(R_f)_nQ_mZ$ wherein $(R_f)_n$, where n is 1 or 2, is a fluorinated saturated monovalent organic radical having a terminal perfluoromethyl group containing from 3 to 20 carbon atoms, in which the carbon atoms of the chain are substituted only by fluorine, chlorine or hydrogen atoms with no more than one hydrogen or chloride atom for every two carbon atoms, and in which a divalent oxygen or trivalent nitrogen atom, bonded only to carbon atoms, can be present in the skeletal chain, $Q_m$, where m is an integer from 0 to 2, is a multivalent linking group, and Z is a water solubilizing polar group, b. a synthetic imputrescible hydrocarbon-congruous organic fluorine-free surfactant water-soluble to at least about 0.02 percent by weight in water at 25° C. and which substantially completely emulsifies at least one phase of a mixture of equal volumes of cyclohexane and water at a concentration of about 0.1 to about 10 percent by weight of the water, in a ratio of 10:1 to 1:25 of fluorinated surfactant: fluorine-free surfactant, c. a water-soluble stabilizer selected from the group consisting of alkyl ethers of alkylene glycol and glycerol, d. and up to 95 weight percent water, said concentrate composition upon dilution with water to contain not more than about 0.4 weight percent of said fluorinated surfactant being capable of forming a tough, durable, rapidly-forming and spreading film on the surface of the hydrocarbon thereby inhibiting the release of vapors therefrom.

2. A method of inhibiting the release of flammable vapors from liquid hydrocarbon materials comprising forming an aqueous solution of a. an aqueous concentrate composition comprising a water soluble fluorinated surfactant of the formula $(R_f)_nQ_mZ$ wherein $(R_f)_n$, where n is 1 or 2, is a fluorinated saturated monovalent organic radical having a terminal perfluoromethyl group and containing from 3 to 20 carbon atoms and at least 20 percent fluorine by weight, in which the carbon atoms of the chain are substituted only by fluorine, chlorine or hydrogen atoms with no more than one hydrogen or chlorine atom for every two carbon atoms, and in which a divalent oxygen or trivalent nitrogen atom, bonded only to carbon atoms, can be present in the skeletal chain, $Q_m$ where m is an integer from 0 to 2, is a multivalent linking group, and Z is a water solubilizing polar group b. a synthetic imputrescible hydrocarbon-congruous organic fluorine-free surfactant water-soluble to at least about 0.02 percent by weight in water at 25° C. and which substantially completely emulsifies at least one phase of a mixture of equal volumes of cyclohexane and water at a concentration of about 0.1 to about 10 percent by weight of the water, in a ratio of 10:1 to 1:25 of fluorinated surfactant: fluorine-free surfactant, c. a water-soluble stabilizer selected from the group consisting of alkyl ethers of alkylene glycol and glycerol, d. and up to 95 percent water, with water to form an aqueous composition containing not more than about 0.4 weight percent of said fluorinated surfactant, applying said aqueous composition onto the surface of said liquid hydrocarbon and forming a tough, durable vapor barrier film on said surface thereby inhibiting the release of hydrocarbon vapors therefrom.

3. A composition useful for suppressing vaporization of liquid hydrocarbons comprising water, a water-soluble fluoroaliphatic surfactant and a synthetic imputrescible hydrocarbon-congruous organic fluorine-free surfactant water-soluble to at least about 0.02 percent by weight in water at 25° C., and which substantially completely emulsifies at least one phase of a mixture of equal volumes of cyclohexane and water at a concentration of about 0.1 to about 10 percent by weight of the water, said composition being substantially free from volatile flammable materials and being capable of forming a tough, durable, rapidly-forming and spreading film on the surface of the hydrocarbon thereby inhibiting the release of flammable vapors therefrom.

4. A composition according to claim 3 wherein said fluoroaliphatic surfactant contains a fluorinated aliphatic radical having a terminal perfluoromethyl group.

5. A composition according to claim 4 wherein the fluoroaliphatic surfactant has a surface tension of less than 23 dynes/cm. in aqueous solution at a concentration of about 0.25 percent by weight or less.

6. A composition according to claim 5 wherein the fluorine-free surfactant is a non-ionic surfactant.

* * * * *

UNITED STATES PATENT OFFICE
CERTIFICATE OF CORRECTION

Patent No. 3,772,195　　　　　Dated November 13, 1973

Inventor(s) Vernon L. Francen

It is certified that error appears in the above-identified patent and that said Letters Patent are hereby corrected as shown below:

Title page, under "Related U.S. Application Data," after "Patent No. 3,562,156" add -- which in turn is a continuation-in-part of U.S. Application 722,630, filed April 19, 1968, now abandoned --, Column 1, line 3, after "Patent No. 3,562,156" and before the period (.) insert -- which in turn is a continuation-in-part of U.S. Application 722,630, filed April 19, 1968, now abandoned --, Column 1, line 7, after "Pat. No. 3,562,156", delete -- vaporization --.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*